United States Patent
Aleksoff et al.

[11] 3,954,322
[45] May 4, 1976

[54] HOLOGRAPHIC DOPPLER-SPREAD IMAGING OF MOVING OBJECTS

[75] Inventors: Carl C. Aleksoff, Ann Arbor, Mich.; Charles R. Christensen, Athens, Ala.

[73] Assignee: The United States of America as represented by the Secretary of the Army, Washington, D.C.

[22] Filed: Feb. 28, 1975

[21] Appl. No.: 554,340

[52] U.S. Cl.................................. 350/3.5; 356/109
[51] Int. Cl.² ......................................... G03H 1/14
[58] Field of Search...................... 350/3.5; 356/109; 73/67.5, 71.3

[56] References Cited
UNITED STATES PATENTS

| | | | |
|---|---|---|---|
| 3,661,437 | 5/1972 | Mottier | 350/3.5 |
| 3,778,130 | 12/1973 | Waters | 350/3.5 |

OTHER PUBLICATIONS
Dyes et al., Applied Optics, Vol. 9, No. 5, May 1970, pp. 1105–1112.
Kurtz, NASA Tech. Brief, B73-10434, Dec. 1973.

*Primary Examiner*—Ronald J. Stern
*Attorney, Agent, or Firm*—Nathan Edelberg; Robert P. Gibson; Robert C. Sims

[57] ABSTRACT

The Doppler frequency shift of coherent light reflected from moving objects is used to obtain resolution much greater than the classical limit for imaging systems. The Doppler information is processed by using the temporal and spatial filtering properties of modulated reference wave holograms formed with a reference wave having a range of frequencies across it matching the Doppler frequencies received from the moving object.

1 Claim, 1 Drawing Figure

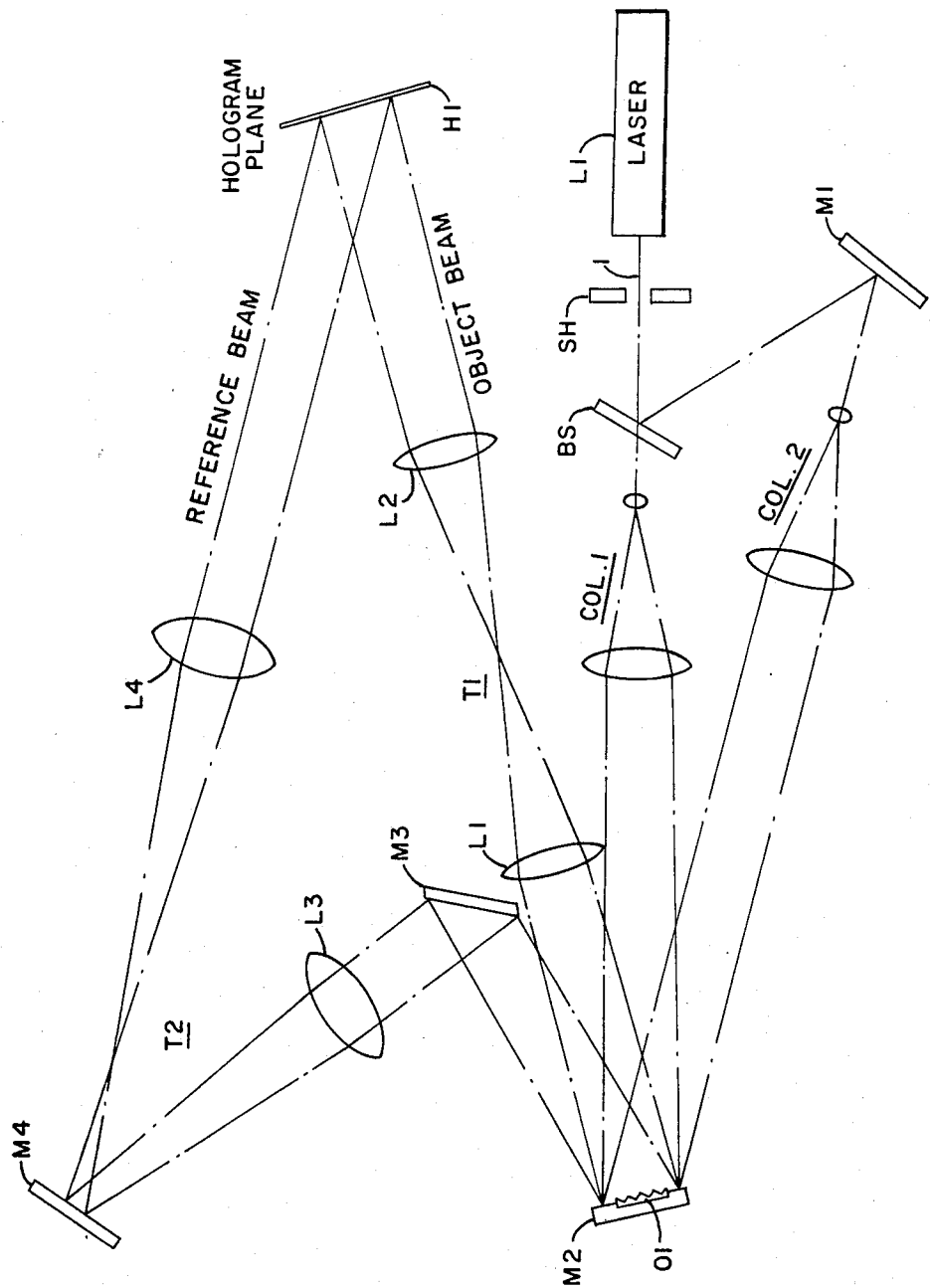

HOLOGRAPHIC DOPPLER-SPREAD IMAGING OF MOVING OBJECTS

The invention described herein may be manufactured, used, and licensed by or for the Government for governmental purposes without the payment to us of any royalties thereon.

SUMMARY OF THE INVENTION

A brief description of the holographic Doppler-spread imaging technique for a rotating object now follows. It is assumed that an optical system is used to image a rotating object illuminated by laser light. The Doppler frequency shift associated with the rotation of the object is used as the encoder for the time channel. Specifically, the light scattered from each point on the object along a particular direction (for a particular illumination and observation direction) has a unique optical carrier frequency. The image is projected onto a photographic emulsion and holographically recorded. The object can be imaged on, a short distance in front of, or behind the emulsion. The reference wave for this hologram comes from a rotating mirror. The reference wave has a temporal frequency shift proportional to spatial position on the hologram such that it matches the Doppler shift from the object. Thus, the temporal filtering property of the hologram decodes the time channel spread function into a spatial spread function. The width of this spatial spread function can now be controlled by the temporal variables instead of the spatial (optical system) variables. The holographic reconstruction can then be a superresolved image. Any object motion (not necessarily rotational motion) that encodes spatial position on the object with a unique Doppler frequency shift will produce the same result.

BRIEF DESCRIPTION OF THE DRAWING

The single FIGURE schematically shows the optical system of the preferred embodiment of the invention.

DESCRIPTION OF THE PREFERRED EMBODIMENT

The FIGURE schematically shows the optical system. The object beam path consists of mirror M1, collimator 2, and object O1, and a concentric telescope T1 of unity power composed of lens L1 and lens L2, denoted as the object telescope. The object beam is directed to object O1 and not to mirror M2. Object O1 is attached to mirror M2. The object may be of a size in plain area which is equal to or less than the size of mirror M2. The reference beam path consists of collimator 1, mirror M2, mirror M3, lens L3, mirror M4 and lens L4. Lens L3 and L4 form a unity power telescope, denoted as the reference telescope T2. The reference and object beam path lengths are equalized by moving M1. The object is illuminated with collimator 2 and imaged onto the hologram plane H1 with the object telescope. The angle between the object beam and the reference beam at mirror M2 and also at the hologram plane is 15°. At 6328A, this corresponds to a spatial frequency of the fringes of approximately 400 lines/mm in the hologram. The film exposure time is controlled by the electronic shutter SH. The hologram plane H1 is perpendicular to the optical axis of the object telescope T1, and the shutter SH is synchronized with the rotation of mirror M2 so that M2 is perpendicular to this optical axis halfway through the exposure.

Rotation of mirror M2 produces a linear spread of Doppler frequencies across the reference beam due to the different relative movement of the face of the mirror M2 to the laser light from laser L1. The object O1 is mounted to mirror M2 as a convenient way of synchronizing the motion of the mirror and object. During shutter open times (about 2° of rotation of the object) the beam angles are as shown in the drawing. Of course, other configurations can be used with the object and mirror M2 on separate rotation tables. The mirror can rotate at speeds from $10^{-5}$ rad/sec to 24 rad/sec. The power of the laser dictates the exposure times. Agfa 10E70 was used as the recording media. The hologram H1 is then reconstructed by blocking the object beam and illuminating the hologram with a single frequency reference beam (no motion of M2).

In operation laser L1 which may be any of the well known lasers generates a laser beam 1 continuously which is blocked by shutter SH until time for an exposure. When shutter SH opens laser beam 1 is split into parts by beam splitter BS. The object beam part is reflected to mirror M1 and is reflected off of mirror M1 to collimator 2. The beam is then directed on object O1 and the scattered light from object O1 is fed to telescope T1. Telescope T1 is used to image the object onto the hologram plane H1 which contains the film. Object O1 is mounted on mirror M2 so as to provide a synchronization of the motion of the mirror M2 and the object. The other portion of the laser beam 1 goes through beam splitter BS through collimator 1 to illuminate mirror M2. The beam is reflected from mirror M2 to mirror M3 then through telescope T2 so as to image what occurs on mirror M2 onto the hologram plane H1. In this way the Doppler frequency shift associated with the rotation of the object is used as the encoder for the time channel. Specifically, the light scattered from each point of the object along a particular direction has a unique optical carrier frequency. The image is projected onto a photographic emulsion located at H1 and holographically recorded. The reference wave for this holograph has a temporal frequency shift proportional to the spatial position on the hologram such that it matches the Doppler shift from the object O1. Thus, the temporal filtering property of the hologram decodes the time channel spread function into a spatial spread function. The width of this spatial spread function can now be controlled by the temporal variables instead of the spatial (telescope) variables. The holographic reconstitution will then be a super-resolved image.

We claim:

1. A holographic Doppler-spread imaging system comprising: a laser for producing a coherent single frequency light beam; a rotating reflecting object which is to be recorded; a plane mirror reflecting means; said mirror reflecting means and said object being attached to each other so that their movements are synchronized; beam-splitting means for directing a portion of said light beam onto said object along a first path and for directing another portion of said light beam onto said mirror reflecting means along a second different path; a first telescope receiving reflected light from said object for imaging said object onto a recording plane; a second telescope receiving reflected light from the reflecting means for imaging said reflecting means onto said recording plane; film means located in said recording plane for recording a hologram of said object; and shutter means located between said laser and beam-splitting means for limiting exposure of said film means so that a holographic recording of the object will occur while the object is rotating and timed to have the reflecting means parallel to the recording plane halfway through the exposure.

* * * * *